Patented Apr. 15, 1947

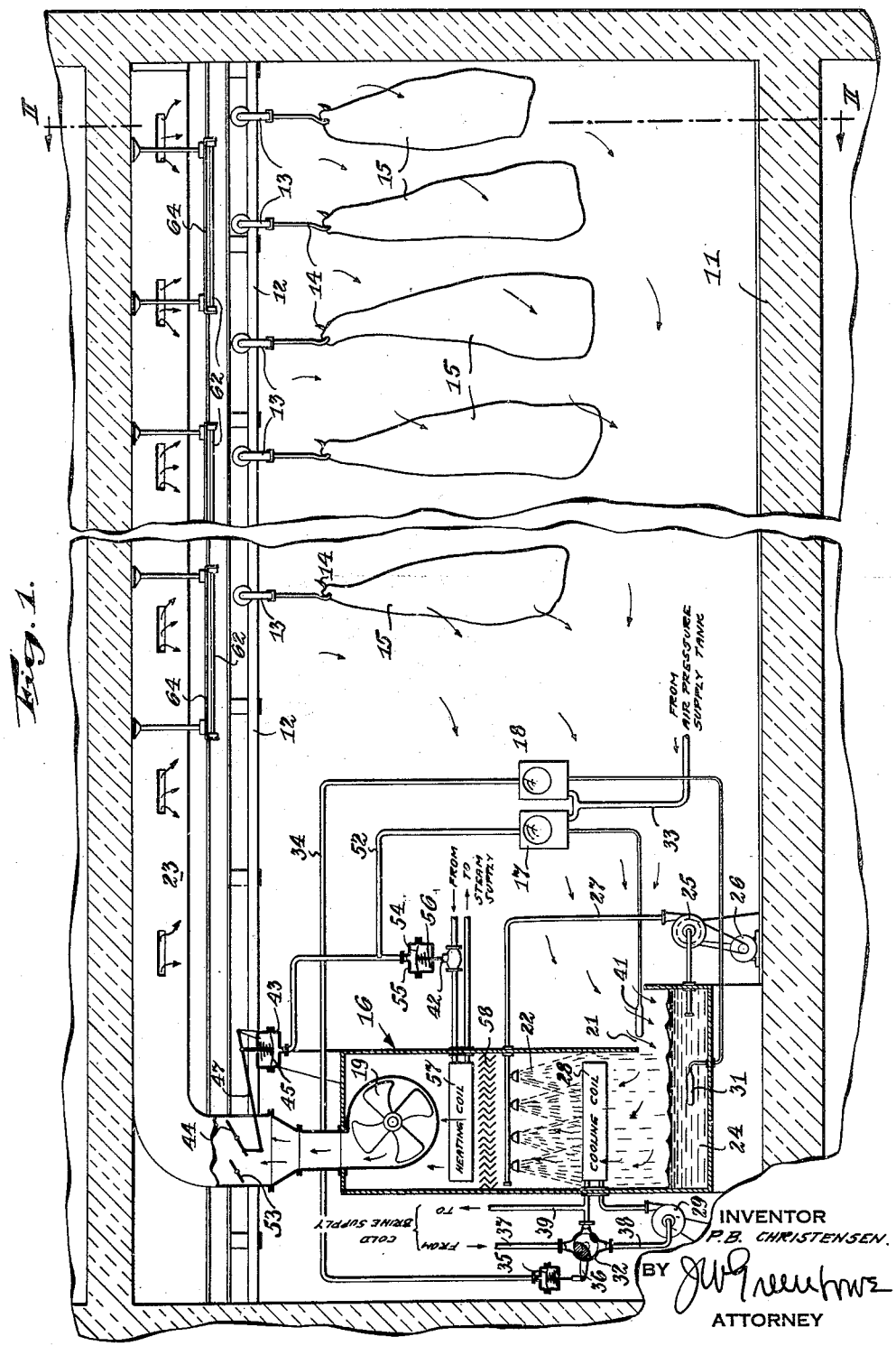

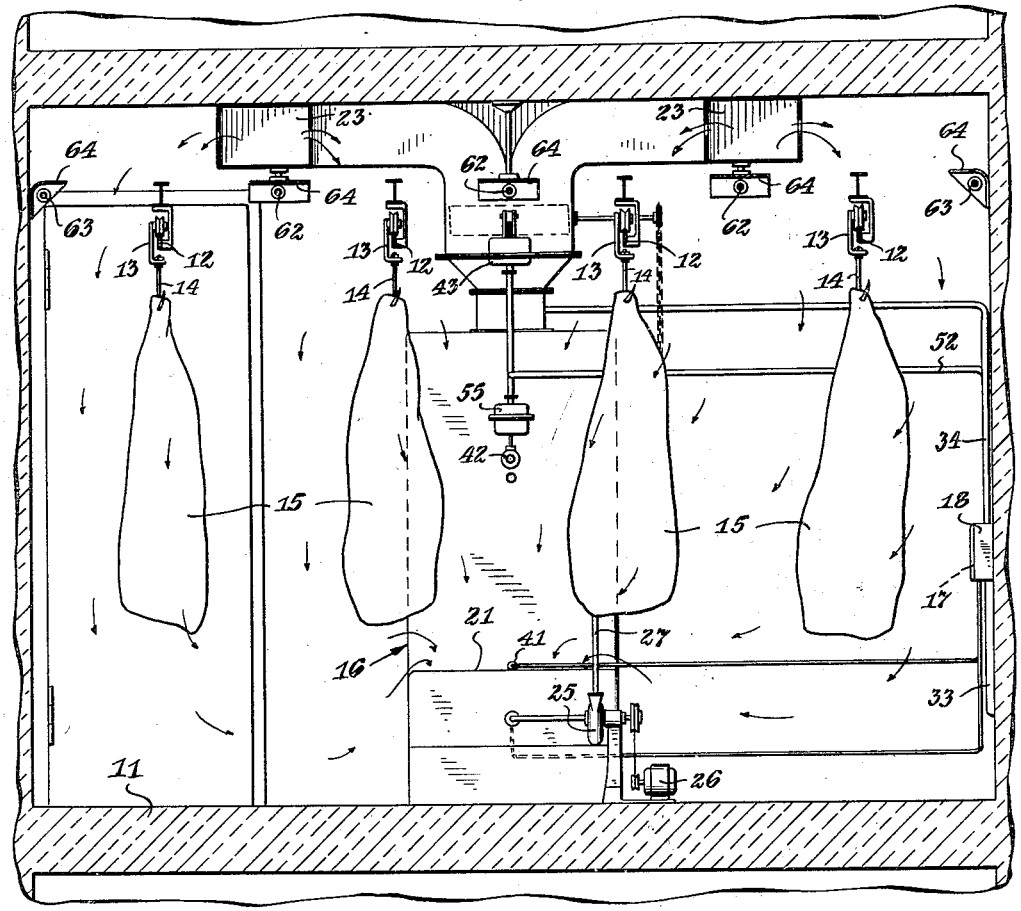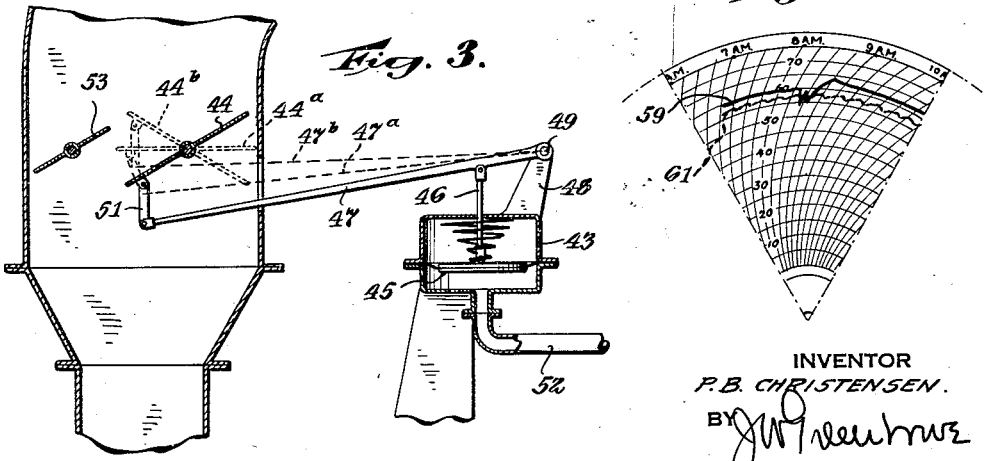

2,419,119

UNITED STATES PATENT OFFICE 2,419,119

APPARATUS FOR TREATING AND STORING MEAT

Paul B. Christensen, Fair Lawn, N. J., assignor, by mesne assignments, to Westinghouse Electric Corporation, a corporation of Pennsylvania Continuation of application Serial No. 316,496, January 31, 1940. This application July 2, 1943, Serial No. 493,227

8 Claims. (Cl. 257—3)

This application is a continuation of my application filed January 31, 1940, Serial No. 316,496, now forfeited and relates to the treatment of food, and more particularly to an improved method and apparatus for tenderizing meat, following generally the teachings of the James Patent #2,169,081, dated August 8, 1939.

The principal object of my invention, generally considered, is to treat meat, and especially beef, to improve the qualities thereof, with the special idea of avoiding the condensation of moisture on said meat when it is first introduced cold to the tenderizing compartment, which normally contains humid air at a relatively high temperature.

An object of my invention is to provide a method for quickly tenderizing meat, in which the condensation of moisture on the cold meat is avoided by temporarily automatically increasing the temperature and lowering the relative humidity of the surrounding air, to allow it to warm the newly introduced meat without depositing moisture thereon.

Another object of my invention is the provision of apparatus for treating meat, comprising a compartment containing means for circulating air, means for cooling and humidifying said air, and means for temporarily heating the air, after humidification, but subsequent to the introduction of chilled meat into said compartment, until said meat has been warmed to a desired tenderizing temperature, and thereby avoid condensation of moisture thereon.

A further object of my invention is the provision, in a meat tenderizing compartment, of air-conditioning and circulating apparatus, including temperature control means for automatically effecting a heating and lowering of the relative humidity of the circulating air upon a drop in temperature, as upon the introduction of chilled meat into said compartment, until said meat has been warmed to approximately the desired tenderizing temperature.

A still further object of my invention is the provision of humidifying, circulating and temperature maintaining apparatus in a meat treating compartment, whereby not only is the rate of flow of the circulated air controlled in accordance with the temperature in the compartment, but the relative humidity and temperature of said circulated air is varied in accordance with the temperature of the meat subjected to the tenderizing treatment.

An additional object of my invention is to provide an improved process and apparatus for tenderizing meat in a relatively short time, such as about three days, while the growth of bacteria and mold is inhibited.

Other objects and advantages of the invention will become apparent as the description proceeds.

In the James Patent #2,169,081 dated August 8, 1939, previously referred to, there is disclosed and claimed a process for the treatment of meat in order to tenderize the same at an increased speed, while at the same time avoiding the development of bacteria and mold on the surface of said meat. The process of said patent has proved very successful and the apparatus disclosed may be successfully employed for the purpose. However, when meat, in large pieces and/or on a large scale, is tenderized by a continuous process, that is when cold meat or that at a temperature between 35° and 40° F., is introduced at one place in a meat treating compartment, while meat, treated for a sufficient length of time to cause the desired tenderization thereof, is removed from another part of said compartment, there is a difficulty encountered in the first step of the operation, due to the fact that it was necessary to move chilled meat, such as beef, whose exterior temperatures might be as low as 40°, and interior temperature as low as 35°, into a warm humid room for the actual tenderizing portion of the process. In accordance with physical laws, there would naturally occur the deposition of moisture on the surface of the beef by condensation. Such a situation is highly undesirable, as even thin films of moisture will lead to a certain amount of loss of the natural bloom of the beef. In larger quantities, this condensation will sometimes accumulate in drops and run down the beef, leaving unsightly streaks. Where drops accumulate but do not run, unsightly spots result. Any long exposure to heavy condensation, will produce effects beyond discoloration, and lead ultimately to the development of undesirable odors on the fat of the beef, as well as accentuate and accelerate the activity of any organisms which might be present, and which require moist conditions for their development.

Two means of attack were employed to eliminate the above difficulties. In the first place, the process was conducted as a batch operation, with a lot of beef being moved into the processing cooler maintained at a temperature of 60° F. desired for processing, but with no humidification of the air in the cooler. Consequently, it was possible to warm the beef from its refrigerated temperature of 35–40° F. to the processing temperature of 60° F. without condensation occurring. This operation is objectionable because of shrinkage, meaning the evaporation of the moisture from the beef, would occur during the warming-up process, adding to the expense. In the second place, beef was moved into the processing cooler in a chilled condition, while the processing cooler was at a temperature of 60° F., and 85–90% relative humidity. As rapidly as condensation formed on the beef, it was rubbed down for removal of this moisture. This operation was objectionable due to added labor costs, and because there was a certain small amount of deterioration in the fresh live appearance of the beef under these circumstances.

In accordance with my invention, it is necessary to have an air-conditioning unit for the recirculation of air in a cooler which will maintain a temperature of 60° F., requiring a cooling effect at certain times, and a heating effect at other times. The operation is, of necessity, continuous and not of a batch nature as in previous work. The cooler is continuously maintained at 85–90%, or at about 90% relative humidity. Chilled beef being moved in, would be in the presence of other beef which had already been in the process for periods of one to two days. Naturally, condensation would occur on the new chilled beef being moved in. However, that, due to the operation of the air-conditioning unit, in accordance with my invention, does not occur to any appreciable extent, or to such an extent as to be of practical commercial importance. The effect of moving in a fresh load of chilled beef is to drop the temperature of the cooler several degrees, with the result that the automatic controls provided for maintaining the tenderizing rooms at 60° F. cause the heating apparatus to come into operation. Steam is admitted to the heating coil over which the cool air is circulated in the unit. The damper in the outlet from the unit to the ducts distributing air to the cooler, is opened to a wide position, so that there is a rapid recirculation of air through the cooler.

This operation causes high temperatures, in some cases as high as 80°–90° F., to be temporarily delivered to the cooler. Humidification is accomplished by passing the circulating air through a water spray, at a temperature of 56° F., with the result that subsequent heating, as to 80°–90° F., results in warm and relatively dry air being distributed to the cooler. The effect of such warm dry air, is to first raise the temperature of the outside layers of the beef very rapidly from 35–40° F. to the temperature of the process room at 60° F., and then the rapid movement of said air serves to evaporate such very thin films of moisture, as might have already condensed on the beef. The result of this combination of operations is that cold meat, such as beef, can be moved into a warm humid room without condensation of undesired moisture, with all of its deteriorating effects occurring. The operation is so adjusted that the period of time during which warm dry air is circulated over the beef is such that undesired condensation is entirely avoided, or eliminated without damage, but not so long continued as to result in undue heating or appreciable shrinkage of the meat.

A record of these operations does not appear on the charts for dry bulb or wet bulb temperatures, since the control points or thermostat bulbs for these recording instruments are located in the inlet of the air-conditioning unit, and consequently measure the characteristics of the air after it has passed over the chilled beef and been cooled by such passage to a temperature of less than 60° F. Measurements of temperature establishing the fundamental conditions outlined above, were made with separate thermometers and instruments out in the cooler, and were not included as part of the operating charts for the process.

The apparatus required for the practicing of my invention may be mainly of standard commercial design and be used for many processes other than that outlined above. A typical unit for the air-conditioning causes air to pass through a spray of chilled water, which is recirculated within the unit itself. This spray water is cooled by coils through which are circulated a refrigerant. In some cases it is advisable and desirable to have the spray water chilled in a remote type water cooler in which these coils are located, but generally it is satisfactory to have the spray water cooling coil located within the casing of the air-conditioning unit. The temperature of the spray may be controlled by a thermostat located in the spray or reservoir of spray water, and operating control valves on the refrigerant lines to the cooling coil.

After passing through the spray, the air passes over coils to which steam may be admitted for heating the air when desired, and controlled by a thermostat bulb located either at the end of the cooler, or out in the cooler itself. In connection with this heating operation, a motor-operated damper in the outlet duct from the unit, is opened as heating is required so that a high rate of air circulation is maintained during the period in which the temperature is being raised back to 60° F., after chilled meat has been introduced.

When the need for heat is past, the steam is cut off from the coils and the damper controlling the heating, comes back to a nearly closed position, thus cutting down the flow of air to a small value. In actual practice, it has been found that even a very heavy loading of chilled beef in the processing cooler, will require a period varying from a few minutes to one to two hours, depending on the temperature of the beef. Consequently there is avoided for the greater part of the forty-eight to seventy-two hour period, which the beef must spend in the processing cooler, a rapid passage of warm air of relatively low humidity, which is accompanied by shrinkage.

Beef, as received in the cooler, will be at a variety of temperatures. When moved from a packer's cooler in the same town with a relatively short truck trip, temperatures are apt to be in the 35 to 40° F. range. When brought from a considerable distance by truck, the temperatures will be more nearly that of the processing room, and may be as high as 50° F., when received. The danger of condensation is very slight in the latter case.

In the drawings:

Figure 1 is a vertical sectional view of a refrigerator, or meat treating compartment, embodying and including means for practicing my invention.

Figure 2 is a transverse, sectional view on the line II—II of Figure 1 in the direction of the arrows.

Figure 3 is an enlarged detailed sectional view of the means for controlling the circulation of air in the compartment of the preceding figures, and Figure 4 is a fragmentary portion of a diagram illustrating what takes place when refrigerated or chilled meat is first introduced into a meat tenderizing compartment in accordance with my invention.

Referring to the drawings in detail, and first considering Figures 1, 2 and 3, there is shown a fragmentary portion of a commercial meat tenderizing compartment or cooler 11, provided with rails 12, on which meat carriages 13 travel, said carriages 13 being desirably provided with hooks or other meat-holding means 14, from which depend carcasses or pieces of meat or beef 15. The compartment 11 may be entered through a vestibule or anteroom (not shown) having a door leading to the outside, or any suitable means for entrance and egress may be provided.

Instead of providing refrigerating coils directly in the meat-treating compartment, as shown in the James patent previously referred to, I have shown the employment of a spray type air conditioning unit in a chamber 16, the operation of which is controlled by instruments 17 and 18. The desired temperature of above 45° F., or about 60° F., in the compartment 11 is maintained by circulating air from the room through the unit 16, as by means of fan or blower 19. The air enters unit 16 through inlet 21, passes upward through water spray 22, in which it is cooled to the desired temperature, preferably about 56° F., or about 4 degrees lower than the desired temperature of the air in said compartment at the same time being saturated to approximately 95% relative humidity by said spray, and passes again into the compartment 11 through duct system 23.

The water which forms the spray 22 is forced from reservoir of spray water 24, as by means of pump 25 driven by motor 26, through pipe 27, and is maintained at a desired constant temperature of about 56° F., as by cooling coil 28 through which flows cold brine, circulated as by means of pump 29. The temperature of the water 24, and consequently that of the spray 22, is regulated by instrument 18, which is actuated by temperature-sensitive bulb 31 located in the reservoir of spray water 24. The instrument 18, in turn, actuates the three-way mixing valve 32, as by means of compressed air from air pressure supply tank lines 33, to branch line 34. The air in the line 34 acts on the diaphragm 35, when desired, and moves the valve lever 36 to introduce more or less of the cold brine from the supply pipe 37 to the circulating pipe 38, which connects with the cooling coil 28, whereby the temperature of said cooling coil corresponds with the needed temperature of the spray water for maintaining a desired tenderizing temperature of about 60° F. in the compartment 11.

The operation of the instrument 18 is such that when the spray water in the reservoir 24 is at the desired temperature, no compressed air is admitted to the pipe 34, so that the valve 32 is closed entirely against brine from the cold supply through pipe 37 and open entirely for recirculating in the line 38. When, however, the temperature of the water in the reservoir 24 is too high, compressed air is allowed to flow through pipe 34 to act on the diaphragm 35 and turn the lever 36 of the valve 32, allowing more or less of the cold brine from the supply through pipe 37 to flow into the system through pipe 38 until the brine circulated by the pump 29 is at the desired temperature. An amount of brine, equal to that introduced by the three-way valve 32, flows back to the cold brine supply through the return pipe 39.

By thus maintaining the water spray 22 at a constant temperature of desirably 4° less than that of the air in the compartment, or say at 56° F., the dew point of the air leaving the unit through duct system 23 is maintained constant. This is dependent on having a sufficient quantity of spray 22 to saturate the air to about 95% when the unit is circulating the maximum quantity of air.

The dry bulb temperature of the chamber is controlled by the instrument 17, which has its temperature sensitive element 41 located in the air inlet 21 to the air conditioning unit 16. Instrument 17 may be a standard pneumatic type temperature controller which operates a standard pneumatically operated steam valve 42, and a standard pneumatically operated damper motor 43. Damper motor 43 operates a full floating damper 44, as shown most clearly in Figure 3, as by means of diaphragm 45, connecting rod 46, lever 47 pivoted to bracket 48, as indicated at 49, and link 51 pivoted to the free end of lever 47 and to damper 44.

When air passing over the bulb 41 is at a desired control temperature of say 60° F., the bulb 41 controls the instrument 17 so that it allows a certain definite air pressure, say 7½ pounds, to be supplied to branch line 52 from the main air supply 33, in which the pressure is desirably from 15 to 17 pounds. With this 7½ pound gauge pressure in line 52, steam valve 42 is so adjusted as to be in a closed position, and damper motor 43 is so adjusted as to hold the lever 47 in the neutral position indicated by the reference character 47ᵃ, which, in turn, holds damper 44 in its closed position, indicated by the reference character 44ᵃ.

When the refrigeration load in the compartment 11 is at a minimum, that is, when meat to be tenderized has reached normal tenderizing temperature, the damper 44 is in position 44ᵃ and the auxiliary damper 53 is then set by hand to such a position as to allow just sufficient air to pass from unit 16 through duct system 23 into the compartment 11, to maintain the desired temperature therein. If the temperature of the air passing over bulb 41 increases, said bulb actuates instrument 17 in such a manner as to allow the pressure of the air in the line 52 to increase. This actuates damper motor 43 to move lever 47 from position 47ᵃ toward position 47ᵇ, and damper 44 from position 44ᵃ to position 44ᵇ, thus allowing more air to pass into duct system 23, and from there back into the compartment 11, to reduce the temperature therein, while keeping steam valve 42 closed.

If the temperature of the air passing over bulb 41 is then lowered to the control point, that is, to 60° F. for example, the entire mechanism will return to its original position, with the damper as indicated by the reference character 44ᵃ. If the temperature of the air passing over bulb 41 falls below the control point, as when a new supply of refrigerated or chilled beef is introduced into the compartment 11, the bulb 41 actuates instrument 17 in such a manner as to decrease the air pressure in branch line 52 below 7½ pounds, as the air passes through the instrument from supply line 33. This reduction in air pressure allows the diaphragm 54 of the steam valve controlling motor 55 to move upwardly under the action of spring 56 and open the valve 42, admitting steam to the heating coil 57. At the same time, the reduction of air pressure in line 52 actuates damper motor 43, moving lever 47 from its position 47ᵃ back toward its full line position, which, in turn, moves damper 44 from its position 44ª toward its full line position.

This combination of actions reheats the air after it passes through spray 22 and baffles 58, which latter remove water drops therefrom, and allows an increased quantity of this air, heated so that its relative humidity decreases, to pass into duct 23, and then into the compartment 11, to increase the temperature of the air therein. As the temperature in said compartment is brought to a point at which the air passing over bulb 41 is returned to the control point, say 60° F., the entire mechanism again returns to its original position at said point.

Referring now to Figure 4, there is disclosed a portion of a chart made on a recording instrument which shows what happens when a batch of cold beef, or other meat, is brought into said compartment. The upper or outer line 59 of said chart represents the temperature of the air around the meat in the compartment as would be measured by 41, while the lower or inner line 61 represents the temperature of the spray 22, as measured by 31. It will, therefore be clear, that the first dip in both lines, at about 8:20 a. m., represents what happens when a batch of chilled meat is first introduced into the compartment 11. That is, the line 59 dips from about 60° F. to about 55° F. causing the valve 42 to open and admit steam to the heating coil 57, and also opening the damper 44 by moving it toward its full-line position and causing an increased circulation of air through the duct system 23, resulting, after irregularity, eventually in an abnormal rise in the compartment temperature, to, in this instance about 63° F., at about 8:45 a. m., after which said temperature gradually decreases to normal.

It will thus be seen that by virtue of the temporary increase in temperature, and corresponding reduction in humidity, after a batch of cold meat has been introduced into the compartment, said increased temperature and relative dryness serves to more quickly bring the chilled meat to a normal tenderizing temperature and, at the same time, avoids a condensation of any appreciable or undesirable amount of moisture on said meat during the warming-up period.

Inasmuch as the present invention involves an improvement over that disclosed in the James patent, previously referred to, and the primary object is to make it possible to tenderize beef and other meat in a shorter time than in accordance with the old "hanging" method, it is essential than an inhibitor of aerobic growths shall be used as disclosed in connection with said patent. In other words, at the substantial increase in temperature at which meat is held for tenderizing purposes, it is not possible without such means to prevent rapid aerobic growths, and I, therefore, propose to use inhibiting means to prevent spoilage due to surface deterioration from such aerobic growths which are either present on the meat as received in the compartment, or may be deposited thereon from the air therein.

Preferred surface growth inhibiting means are radiant energy lamps operated at low temperature and generating ultra-violet radiations which will kill bacterial, fungus, and other aerobic organisms, before they have a deteriorating effect on the surface of the meat. I prefer to use a lamp such as described and claimed in the James Patent No. 2,258,765, because such a lamp generates rays in which the spectrum in the region between 2500 and 3000 A. U. is strong, with substantially no radiations below about 2500 A. U. and in the infra-red region. The intensity of the radiations from such lamps may be regulated by the current therethrough so that those generated are sufficient to inhibit the growth of fungi and bacteria, without causing rancidity of the fat or other undesirable effects within the period of time required for tenderizing the meat.

In Figures 1 and 2, I have indicated the disposition of such lamps by the reference character 62, for those which are longitudinally disposed with respect to the compartment 11 and lie intermediate the side walls thereof. Other lamps of the same character designated as 63, may be disposed along the walls, as indicated, and all are desirably positioned above the meat and provided with reflectors 64, so as to direct the radiations therefrom downwardly upon the meat for exerting a bactericidal action thereon.

A preferred disposition of the lamps is such that they are not directly in the path of the strongest air currents whereby they operate more efficiently. In other words, some of said lamps are disposed directly beneath the branches of the air duct system 23, while others are disposed at about the same level, but lie along the side walls, and all of said lamps are protected from strong air currents, not only because of their positions, but also by the overlying reflectors 64.

From the foregoing disclosure, it will be seen that I have provided improved means for not only tenderizing meat, but also for avoiding undesirable moisture condensation on said meat when first introduced in a chilled condition to the warmer and more humid tenderizing compartment, by temporary decrease in the relative humidity of the circulating air, at the same time increasing the efficiency of tenderizing by bringing the meat up to the desired tenderizing temperature in a more expeditious manner than would be possible if the air in the compartment were not temporarily increased in temperature.

Although a preferred embodiment of my invention has been disclosed, it will be understood that modifications may be made within the spirit and scope of the appended claims.

I claim:

1. In apparatus for treating and/or storing meat, the combination of a compartment having air distributing ducts, a normally closed damper for controlling the flow of air to said ducts, air conditioning means disposed in said compartment and comprising a chamber connected to said ducts and having a reservoir of water disposed in the bottom thereof, a blower in the top thereof for circulating air from said compartment through said chamber over said water and distributing it to said compartment through said ducts, spray nozzles disposed between said water and blower, means for drawing water from said reservoir and discharging it through said nozzles to humidify the circulating air and return to said reservoir, means in said compartment for controlling the temperature of said water, temperature sensitive means immersed in said water to govern the action of said controlling means, a cooling coil in the path of the spray from said nozzles, said controlling means causing circulation of more or less cooling fluid through said cooling coil to keep the reservoir water at substantially uniform temperature in accordance with the action of said sensitive means, a heating coil disposed between said nozzles and blower, a temperature controller disposed in said compartment, and sensitive means in the inlet to said chamber for causing said temperature controller to effect the admission of heating fluid to said heating coil, when the temperature of the air in said inlet is reduced below a predetermined point, and simultaneously open said damper to allow increased circulation through said ducts to bring the temperature in the compartment back to normal.

2. In apparatus for treating and/or storing meat, the combination of a compartment having air distributing ducts, a normally closed damper for controlling the flow of air to said ducts, air conditioning means comprising a chamber connected to said ducts and having a reservoir of water disposed in the bottom thereof, a blower in the top thereof for circulating air from said compartment through said chamber over said water and distributing it to said compartment through said ducts, spray nozzles disposed between said water and blower, means for drawing water from said reservoir and discharging it through said nozzles to humidify the circulating air and return to said reservoir, means in said compartment for controlling the temperature of said water, temperature sensitive means immersed in said water to govern the action of said controlling means, said controlling means causing circulation of more or less cooling fluid through means to keep the reservoir water at substantially uniform temperature in accordance with the action of said sensitive means, a heating coil disposed between said nozzles and blower, a temperature controller disposed in said compartment, and sensitive means in the inlet to said chamber for causing said temperature controller to effect the admission of heating fluid to said heating coil, when the temperature of the air in said inlet is reduced below a predetermined point, and simultaneously open said damper to allow increased circulation through said ducts to bring the temperature in the compartment back to normal.

3. In apparatus for treating and/or storing meat, the combination of a compartment having air distributing ducts, a normally closed damper for controlling the flow of air to said ducts, air conditioning means disposed in said compartment and comprising a chamber connected to said ducts and having a reservoir of water disposed in the bottom thereof, means for circulating air from said compartment through said chamber over said water and distributing it to said compartment through said ducts, means for drawing water from said reservoir and spraying to humidify the circulating air, means in said compartment for controlling the temperature of said water, temperature sensitive means immersed in said water to govern the action of said controlling means, said controlling means causing circulation of more or less cooling fluid through means to keep the reservoir water at substantially uniform temperature in accordance with the action of said sensitive means, heating means disposed between the spraying means and blower, a temperature controller disposed in said compartment, and sensitive means in the inlet to said chamber for causing said temperature controller to energize said heating means when the temperature of the air in said inlet is reduced below a predetermined point, and simultaneously open said damper to allow increased circulation through said ducts to bring the temperature in the compartment back to normal.

4. In apparatus for treating and/or storing meat, the combination of a compartment having air distributing ducts, a normally closed damper for controlling the flow of air to said ducts, air conditioning means comprising a chamber connected to said ducts and having a reservoir of water disposed in the bottom thereof, a blower in the top thereof for circulating air from said compartment through said chamber over said water and distributing it to said compartment through said ducts, spray nozzles disposed between said water and blower, means for drawing water from said reservoir and discharging it through said nozzles to humidify the circulating air, means in said compartment for controlling the temperature of said water, temperature sensitive means immersed in said water to govern the action of said controlling means, said controlling means causing circulation of more or less cooling fluid through means to keep the reservoir water at substantially uniform temperature in accordance with the action of said sensitive means, a heating coil disposed between said nozzles and blower, a temperature controller disposed in said compartment, and sensitive means in the inlet to said chamber for causing said temperature controller to effect the admission of heating fluid to said heating coil, when the temperature of the air in said inlet is reduced below a predetermined point, and simultaneously open said damper to allow increased circulation through said ducts to bring the temperature in the compartment back to normal.

5. In apparatus for treating and/or storing meat, the combination of a compartment having air distributing ducts, a normally closed damper for controlling the flow of air to said ducts, air conditioning means disposed in said compartment and comprising a chamber connected to said ducts and having a reservoir of water disposed in the bottom thereof, a blower in the top thereof for circulating air from said compartment through said chamber over said water and distributing it to said compartment through said ducts, spray nozzles disposed between said water and blower, means for drawing water from said reservoir and discharging it through said nozzles to humidify the circulating air and return to said reservoir, means in said compartment for controlling the temperature of said water, temperature sensitive means immersed in said water to govern the action of said controlling means, said controlling means causing circulation of more or less cooling fluid through means to keep the reservoir water at substantially uniform temperature in accordance with the action of said sensitive means, a heating coil disposed between said nozzles and blower, a temperature controller disposed in said compartment, and sensitive means in the inlet to said chamber for causing said temperature controller to effect the admission of heating fluid to said heating coil, when the temperature of the air in said inlet is reduced below a predetermined point, and simultaneously open said damper to allow increased circulation through said ducts to bring the temperature in the compartment back to normal.

6. In apparatus for treating and/or storing meat, the combination of a compartment having air distributing ducts, a normally closed damper for controlling the flow of air to said ducts, air conditioning means for said compartment and comprising a chamber connected to said ducts and having a reservoir of water disposed in the bottom thereof, a blower in the top thereof for circulating air from said compartment through said chamber over said water and distributing it to said compartment through said ducts, spray nozzles disposed between said water and blower, means for drawing water from said reservoir and discharging it through said nozzles to humidify the circulating air and return to said reservoir, means in said compartment for controlling the temperature of said water, temperature sensitive means immersed in said water to govern the action of said controlling means, cooling means for the water to be sprayed from said nozzles, said controlling means causing more or less action of said cooling means to keep the reservoir water at substantially uniform temperature in accordance with the action of said sensitive means, a heating coil disposed between said nozzles and blower, a temperature controller disposed in said compartment, and sensitive means in the inlet to said chamber for causing said temperature controller to effect the admission of heating fluid to said heating coil, when the temperature of the air in said inlet is reduced below a predetermined point, and simultaneously open said damper to allow increased circulation through said ducts to bring the temperature in the compartment back to normal.

7. In apparatus for treating and/or storing meat, the combination of a compartment having air distributing ducts, a normally closed damper for controlling the flow of air to said ducts, air conditioning means comprising a chamber connected to said ducts and having a reservoir of water disposed in the bottom thereof, a blower in the top thereof for circulating air from said compartment through said chamber over said water and distributing it to said compartment through said ducts, spray nozzles disposed between said water and blower, means for drawing water from said reservoir and discharging it through said nozzles to humidify the circulating air and return to said reservoir, means in said compartment for controlling the temperature of said water, temperature sensitive means immersed in said water to govern the action of said controlling means, said controlling means causing circulation of more or less cooling fluid through means to keep the reservoir water at substantially uniform temperature in accordance with the action of said sensitive means, a heating coil disposed between said nozzles and blower, a temperature controller disposed in said compartment, and sensitive means in the inlet to said chamber for causing said temperature controller to open said damper, to allow increased circulation through said ducts to bring the temperature in the compartment back to normal, in one direction when the temperature of the air in said inlet is reduced below, and in the other direction when said temperature is increased above, a predetermined point, and simultaneously effect the admission of heating fluid to said heating coil only when the temperature of the air in said inlet is reduced below a predetermined point.

8. In apparatus for treating and/or storing meat, the combination of a compartment, a blower for circulating air in said compartment, control apparatus including a reservoir of water, means of controlling the temperature thereof, spray nozzles disposed in the path of said circulated air, means for drawing water from said reservoir and discharging it through said nozzles for maintaining desired temperatures and humidities in said air, a heating coil disposed between said nozzles and blower, an air temperature controller disposed in said compartment, and sensitive means for causing said temperature controller to effect the admission of heating fluid to said coil when the temperature of air circulating thereover is reduced below a predetermined point, and simultaneously increase the circulation of air from said blower, as when meat which chills said air below the dew point is introduced, until said meat has been increased in temperature sufficiently to avoid condensation of moisture thereon.

PAUL B. CHRISTENSEN.

REFERENCES CITED

The following references are of record in the file of this patent:

UNITED STATES PATENTS

| Number | Name | Date |
|---|---|---|
| 1,068,272 | Rayson | July 22, 1913 |
| 2,169,081 | James | Aug. 8, 1939 |
| 1,861,158 | Hilger | May 31, 1932 |
| 2,207,714 | Bulkeley | July 16, 1940 |
| 2,250,260 | Fowler | July 22, 1941 |

OTHER REFERENCES

"The Tenderization of Meat," published by the Industrial Fellowship on Meat Merchandising, Mellon Institute, Pittsburgh, Pa., 1940, pages 1 to 6.